US012579806B2

(12) United States Patent (10) Patent No.: US 12,579,806 B2
Ebner et al. (45) Date of Patent: Mar. 17, 2026

(54) STABLE OBJECT DETECTION AND CREATION OF ANCHORS IN AUGMENTED REALITY SCENES

(71) Applicant: CareAR Holdings LLC, Norwalk, CT (US)

(72) Inventors: Fritz Ebner, Pittsford, NY (US); Ashish Tisgaonkar, Rochester, NY (US)

(73) Assignee: CAREAR HOLDINGS LLC, Norwalk, CT (US)

( * ) Notice: Subject to any disclaimer, the term of this patent is extended or adjusted under 35 U.S.C. 154(b) by 566 days.

(21) Appl. No.: 18/051,575

(22) Filed: Nov. 1, 2022

(65) Prior Publication Data

US 2024/0144675 A1 May 2, 2024

(51) Int. Cl.
*G06V 20/58* (2022.01)
*G06V 10/75* (2022.01)
*G06V 20/20* (2022.01)
*G06V 20/70* (2022.01)

(52) U.S. Cl.
CPC ............ *G06V 20/20* (2022.01); *G06V 10/751* (2022.01); *G06V 20/70* (2022.01)

(58) Field of Classification Search
CPC ....... G06V 20/20; G06V 10/751; G06V 20/70
See application file for complete search history.

(56) References Cited

U.S. PATENT DOCUMENTS

| | | | | |
|---|---|---|---|---|
| 2019/0102908 A1* | 4/2019 | Yang | ...................... | G06V 10/82 |
| 2020/0177960 A1* | 6/2020 | Rakshit | ................ | H04N 21/858 |
| 2022/0004771 A1* | 1/2022 | Grancharov | ........... | G06V 20/41 |
| 2024/0045841 A1* | 2/2024 | Wang | .................... | G06F 9/4493 |
| 2024/0104891 A1* | 3/2024 | Takahashi | .............. | G06V 10/82 |

* cited by examiner

*Primary Examiner* — Han Hoang
(74) *Attorney, Agent, or Firm* — Fleit Intellectual Property Law; Jon Gibbons

(57) ABSTRACT

A system for object detection in an augmented reality scene includes a computing system adapted to receive a stream of images from a user device. For each image in a plurality of successive images from the stream of images, the computing system: generates predictions for objects identified in the image using object models from a datastore; compares the predictions with proposals from the datastore, the comparison including checking an overlap threshold of the predictions and the proposals; updates the proposals with the predictions if the overlap threshold is met, otherwise adds new proposals to the proposals using the predictions; filters the proposals to create stable object detections based on a stability threshold; annotates the image using the stable object detections; and sends the annotated image to the user device for presentation.

19 Claims, 7 Drawing Sheets

Labels
| AC_LED_Off
| AC_LED_Off
| PSU_L_In
| PSU_R_In
| PS_LED_Off
| PS_LED_Off
| Powercable_Unplugged
| Powercable_Unplugged

FIG. 4

$$STT\text{-}IOU \;=\; \frac{volume\ of\ overlap}{volume\ of\ union}$$

FIG. 5

STABLE OBJECT DETECTION AND CREATION OF ANCHORS IN AUGMENTED REALITY SCENES

TECHNICAL FIELD

The present teachings relate generally to augmented reality and, more particularly, to systems and methods for object detection.

BACKGROUND

Augmented reality (AR) is an interactive experience with a real-world environment where real-world objects are enhanced with computer-generated information. Computer-generated information can be both constructive (i.e., over-laid and additive) and destructive (i.e., masking). AR typically incorporates a combination of real and virtual worlds, real-time interaction, and 3D registration of virtual and real-world objects.

Object detection (also referred to as AR object recognition) associates a digital model to a real-world object so that it can be identified and manipulated in a virtual context. In this way, users in an AR system can interact with a real-world object that is being simulated. This could include, for example, virtual annotations (e.g., overlayed instructions, identify parts, etc.) or adjusting the object (e.g., opening or closing parts, etc.).

There are a number of problems associated with traditional object detection system and methods. For example, bounding boxes may be unstable and "jump" when there is camera movement, which may result in errors such as transient false positives. Therefore, it would be beneficial to have an alternative system and method for stable object detection and creation of anchors in augmented reality scenes.

SUMMARY

The needs set forth herein as well as further and other needs and advantages are addressed by the present embodiments, which illustrate solutions and advantages described below.

One embodiment of a system for object detection in an augmented reality scene according to the present teachings includes, but is not limited to, a computing system adapted to receive a stream of images from a user device. For each image in a plurality of successive images from the stream of images, the computing system is adapted to: generate predictions for objects identified in the image using object models from a datastore; compare the predictions with proposals from the datastore, the comparison including checking an overlap threshold of the predictions and the proposals; update the proposals with the predictions if the overlap threshold is met, otherwise add new proposals to the proposals using the predictions; filter the proposals to create stable object detections based on a stability threshold; annotate the image using the stable object detections; and send the annotated image to the user device for presentation.

In one embodiment, the checking an overlap threshold comprises using spatio-temporal tube intersection-over-union analysis, the overlap threshold comprises at least 50% of overlap, the updating the proposals with the predictions comprises averaging coordinates of the predictions with coordinates of the proposals, the stability threshold comprises the proposals existing for at least 5 images, and the annotating the image comprises adding a bounding box.

In one embodiment, the annotating the image comprises placing an anchor by ray casting at a center of one of the stable object detections, the anchor is stored in an anchor list in the datastore, and the anchor is only placed when an anchor overlap threshold with another anchor in the anchor list is not exceeded.

In one embodiment, the predictions generated using the object models comprise labels, confidence values, and/or bounding boxes.

In one embodiment, the annotating the image comprises adding a bounding box.

In one embodiment, the checking an overlap threshold comprises using spatio-temporal tube intersection-over-union analysis, and the overlap threshold comprises at least 50% of overlap.

In one embodiment, the stability threshold comprises the proposals existing for at least 5 images.

In one embodiment, the updating the proposals with the predictions comprises averaging coordinates of the predictions with coordinates of the proposals.

In one embodiment, the computing system is adapted to, for each image in the plurality of sequential images from the stream of images: filter the predictions, the filtering including removing predictions for objects that are not in a specified subset, the filtering also including removing predictions for objects that are not in a specified hierarchy of objects.

In one embodiment, the removing predictions that are not in the specified hierarchy of objects comprises identifying a parent object for an identified object.

In one embodiment, the specified subset comprises predictions for objects that relate to a task that is part of an augmented reality workflow.

In one embodiment, the user device comprises a mobile device.

In One Embodiment, the Annotating the Image Comprises Adding a Link to an Action.

In one embodiment, the action comprises providing information about an associated object, information about a workflow step, and/or a link to a website.

One embodiment of an augmented reality support platform according to the present teachings includes, but is not limited to, a system for object detection. The identified objects are parts of a product that is being supported and the computing system is adapted to provide tasks for trouble-shooting support of the product, and to detect whether a task has been completed.

One embodiment of augmented reality support platform according to the present teachings includes, but is not limited to, a computing system adapted to receive a stream of images from a user device. For each image in a plurality of successive images from the stream of images, the computing system is adapted to: generate predictions for objects identified in the image using object models from a datastore; compare the predictions with proposals from the datastore, the comparison including using spatio-temporal tube intersection-over-union analysis to check an overlap threshold of the predictions and the proposals; update the proposals with the predictions if the overlap threshold is met, otherwise add new proposals to the proposals using the predictions, the updating including averaging coordinates of the predictions with coordinates of the proposals; filter the proposals to create stable object detections that have existed for a minimum number of images; annotate the image using the stable object detections; and send the annotated image to the user device for presentation. The identified objects are parts of a product that is being supported, the computing system is adapted to provide tasks for troubleshooting support of the product, and to detect whether a task has been completed.

In one embodiment, the overlap threshold comprises at least 50% of overlap, and the minimum number of images is 5.

In one embodiment, the annotating the image comprises placing an anchor by ray casting at a center of one of the stable object detections, the anchor is stored in an anchor list in the datastore, and the anchor is only placed when an anchor overlap threshold with another anchor in the anchor list is not exceeded.

In one embodiment, the computing system is adapted to, for each image in the plurality of sequential images from the stream of images: filter the predictions, the filtering including removing predictions for objects that are not in a specified subset, the filtering also including removing predictions for objects that are not in a specified hierarchy of objects.

One embodiment of a method for object detection in an augmented reality scene according to the present teachings includes, but is not limited to, receiving, with a computing system, a stream of images from a user device. For each image in a plurality of successive images from the stream of images the following is performed: generating predictions for objects identified in the image using object models from a datastore; comparing the predictions with proposals from the datastore, the comparison including checking an overlap threshold of the predictions and the proposals; updating the proposals with the predictions if the overlap threshold is met, otherwise adding new proposals to the proposals using the predictions; filtering the proposals to create stable object detections based on a stability threshold; annotating the image using the stable object detections; and sending, with the computing system, the annotated image to the user device for presentation.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

BRIEF DESCRIPTION OF THE DRAWINGS

FIG. 4 is an illustration of non-unique objects within unique objects in object detection.

FIG. 5 is an illustration of overlap comparison according to the present teachings.

DETAILED DESCRIPTION

Figure 1:
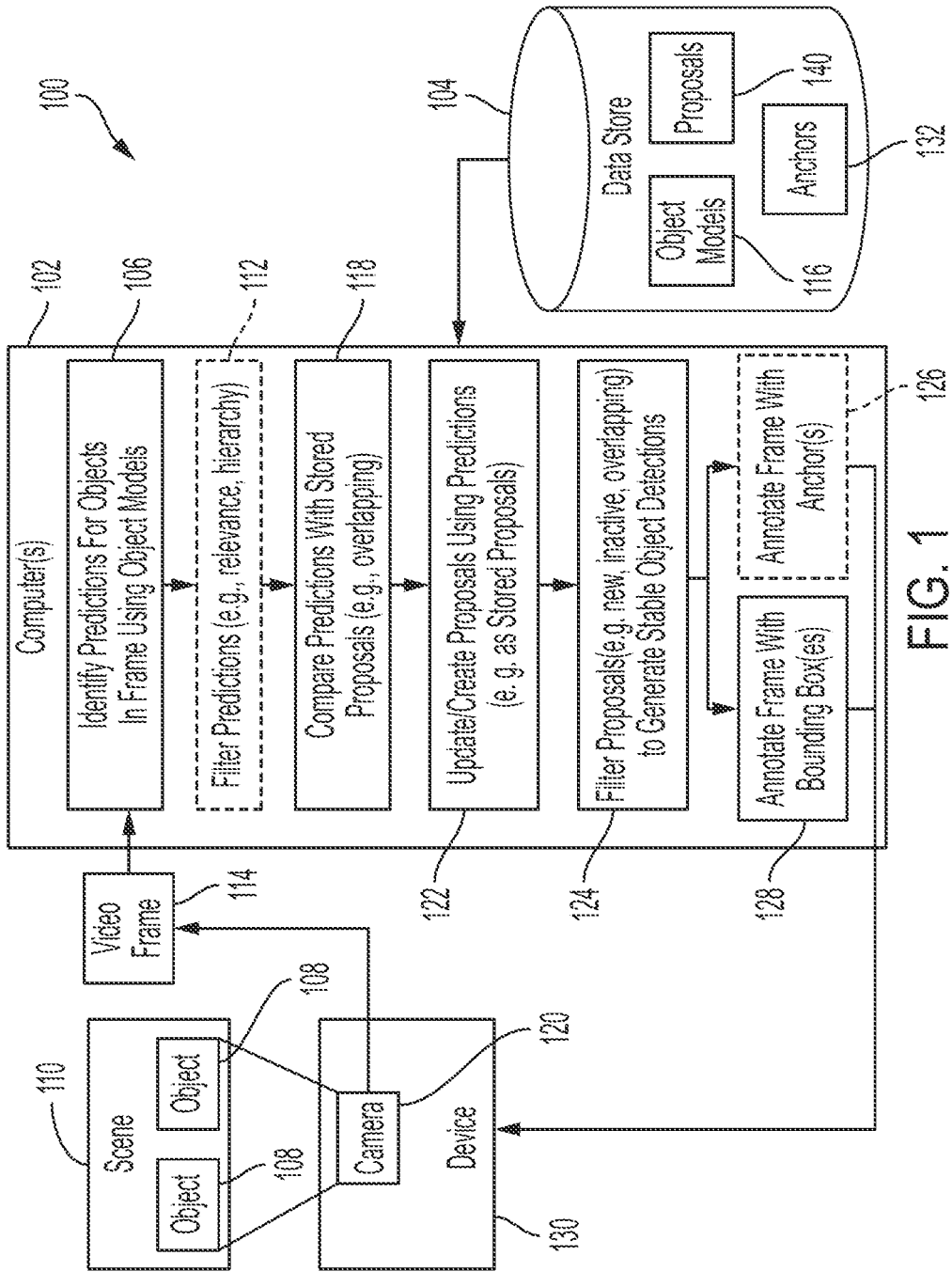
FIG. 1 is a diagram of one embodiment of a system for augmented reality according to the present teachings.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

A "computing system" may provide functionality for the present teachings. The computing system may include software executing on computer readable media that may be logically (but not necessarily physically) identified for particular functionality (e.g., functional modules). The computing system may include any number of computers/processors, which may communicate with each other over a network. The computing system may be in electronic communication with a datastore (e.g., database) that stores control and data information. Forms of at least one computer-readable medium include, but are not limited to, disks, hard drives, random access memory, programmable read only memory, or any other medium from which a computer can read.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, it is noted that none of the appended claims or claim elements are intended to invoke 35 U.S.C. 112(f) unless the words "means for" or "step for" are explicitly used in the particular claim.

Augmented Reality (AR) may be used to enhance real-world objects with computer-generated information. As a basic example, a camera on a smartphone can be used to capture an image of a user's environment and present that image on the smartphone's display. Annotations in the form of bounding boxes, text, etc. may be overlayed on the image to label certain objects and/or provide other relevant information. In addition to visual enhancements, AR presentations may use other sensory modalities such as auditory, haptic, somatosensory and olfactory modalities to present relevant information to a user, although not limited thereto.

AR has many different uses including, for example, as part of a support platform. When computer hardware or other physical equipment is not working correctly, a service call is typically placed to a service provider so that remediation can be performed by a support professional (e.g., knowledge expert). However, service calls and follow-up visits can be expensive and impact customer downtime. Using AR, service professionals may provide real-time access to expertise to customers, employees, field workers, etc.

An AR support platform can be used to provide users with instruction workflows that help a user to perform tasks. Tasks can include validation steps, where the system can help detect whether the desired result of the task has been completed. A "desired result" (or "end state") may be a special case of what can be termed "object states" (e.g., has door been opened, has part been replaced, etc.). An object state can be any detection of an object which can be differentiated from other states. For example, an object state might comprise a door which is open or closed, or a switch which is on or off, etc.

Object states may be detected using a computer vision approach which employs deep learning networks. Object states may be used to confirm that a task has been accomplished, for example if the back door of a printer has been opened, or if a toner drum has been removed. The notion of object state can be thought of as the 'context' of the object that allows an identification or understanding of a state of the object. In AR service workflows in particular there is a need to decode information for a non-expert user.

In support software that provides users with AR instruction workflows, the workflows may comprise AR steps or actions that help the user to perform tasks. Part of each task can comprise displaying AR annotations (e.g., clickable hotspots) that are fixed to a part of a product, or other object. These can be called the "object states."

Current object (and object state) detection systems have a number of problems, including: transient false positives; unstable/jumping bounding boxes; inability to detect non-unique objects within unique objects; detecting only subset of labels; and not keeping track of stable proposals in world state. The present teachings address these and other problems by providing systems and methods where stored predictions (e.g., for annotations) are tracked over multiple image frames and compared to proposals in each frame generated by object models. In this way, stable object detections can be created.

Referring now to FIG. 1, shown is a diagram of one embodiment of a system for augmented reality according to the present teachings. As shown, one or more computers 102 (also generically referred to as a "computing system") may provide functionality for the present teachings. The computer/computing system 102 may include any number of computers/processors, which may communicate with each other over a network and rely on distributed computing resources. The computer 102 may typically be in the form of one or more servers executing instructions stored on computer readable media to perform functionality according to the present teachings.

The computer 102 may be in electronic communication with a database (e.g., data store 104) that may store information on objects, states, products, training materials, support information, user interfaces, etc., as appreciated by one skilled in the art.

The computer 102 may include software executing on computer readable media that may be logically (but not necessarily physically) identified for particular functionality (e.g., functional modules). An object predictor 106 may receive image frames 114 (e.g., video) of objects 108 (e.g., parts of a product or other physical thing) in a scene 110 (e.g., environment). The object predictor 106 may identify object annotations (i.e., predictions) in the image frame 114 using object models 116 stored in the database 104.

A filter 112 may filter the predictions. As discussed in more detail below, this may include filtering out predictions (e.g., objects) that are not relevant to a current task. Filtering may also include filtering out predictions that are not relevant to specified hierarchies of objects (e.g., may only care about buttons on a certain panel, etc.).

A comparer 118 may compare the predictions (which may be filtered) with proposals 140 stored in the database 104. Proposals may be thought of as identified objects (annotations) that exist from a previous frame and are stored to give "state" to those objects/annotations. Comparing may include seeing if the predictions overlap with the proposals. For example, a camera 120 that is imaging objects 108 may move (e.g., shake, etc.) from frame to frame and the comparing can help determine whether a predicted object is the same as an object previously identified in a proposal, or if it is a new object that needs to be tracked.

A proposal creator 122 may create (or update) proposals based on the comparing. A proposal for an object may need to be updated, for example, if it has moved in the frame or its state has changed (e.g., door has changed to "open"). A new proposal may need to be created if a new object has been identified.

A remover 124 may modify the proposals by, for example, removing inactive proposals (e.g., objects for proposal no longer identified in predictions for frame 114) or removing overlapping proposals to reduce clutter, although not limited thereto. Proposals can also be removed if they have not existed long enough, i.e., are not stable. In this way, stable object detections can be created based on, for example, if proposal has existed for a certain number of frames (e.g., 2, 3, 4, 5, 10, 15, 20, 25, 30, 35, 40, 45, 50, 75, 100, 200, etc.).

An annotator 128 may annotate the frame 114 using the stable object detections. For example, if the camera 120 is abruptly moved so that a new object is identified, and then moved back, that new object may not be annotated because it is not stable (i.e., did not exist in stream of frames for minimum number of frames).

An anchorer 126 may set an anchor in the frame 114 using the stable object detections. This may give state to an object so that it can be tracked in world-space, for example, if the detected object goes out of frame. The anchors 132 may be stored in the database 104. Once an anchor is dropped, it may be desirable to ignore annotations that have sufficient IOU overlap over an anchor bounding box.

The annotated frame can be sent back to a device 130 for display. The annotations may form the augmented reality, i.e., the scene 110 and objects 108 are annotated for a user of the device 130 (i.e., on its display). The device 130 may be any type of computing device, such as a desktop computer, tablet, mobile device, etc. However, it may be preferable to be a mobile device with a built-in camera 120 for scanning the objects 108. The objects 108 may be, for example, parts of a product being supported or another physical thing.

Figure 2:
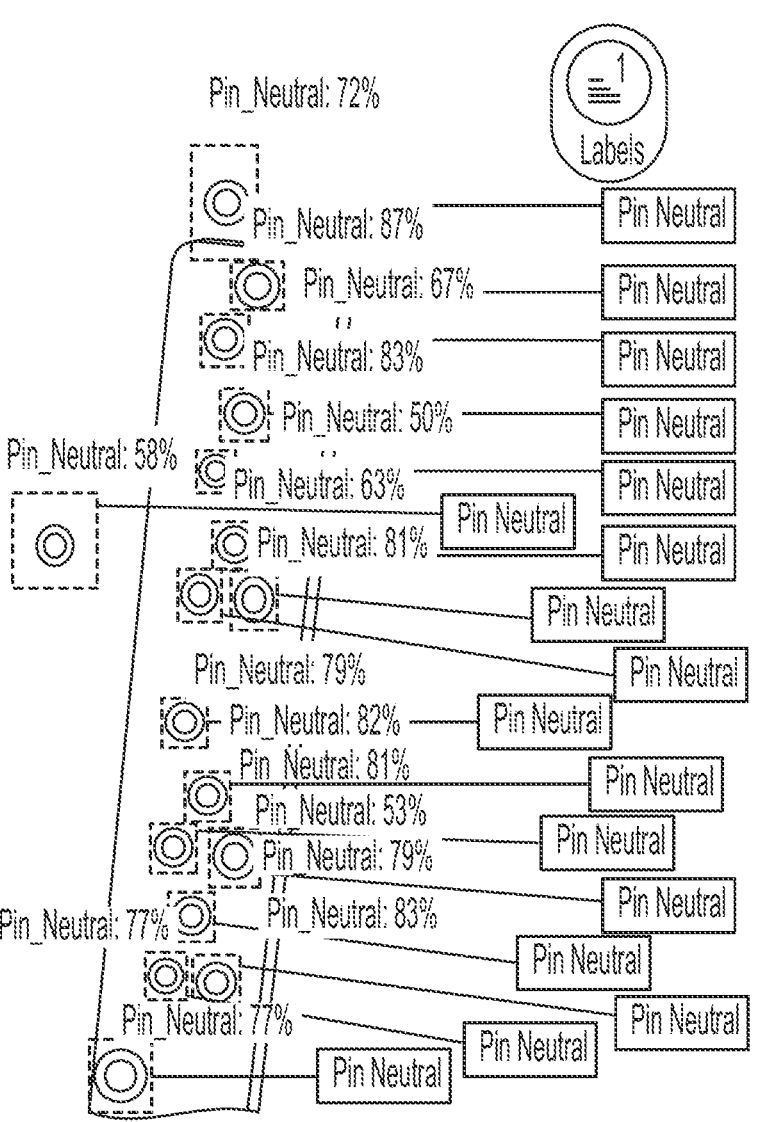
FIG. 2 is an illustration demonstrating false positives in object detection.

Referring now to FIG. 2, shown is an illustration demonstrating false positives in object detection. "Transient" false positives can be observed in state detection because of relative camera motion (e.g., blur). A false positive occurs when the object model misclassifies an object/state detection. These transient false positives can lead to incorrectly validating task achievement, which presents a problem in the support context.

In the model output shown, an object model is trained to detect "electric socket pins" on a power strip. There are multiple false positives, including at the edge of a power button at the bottom and on things in the background of the scene. Such false positive could incorrectly validate state detection and thus should be suppressed. Using the present teachings, such false positives can be reduced or eliminated by only annotating stable object detections.

Figure 3:
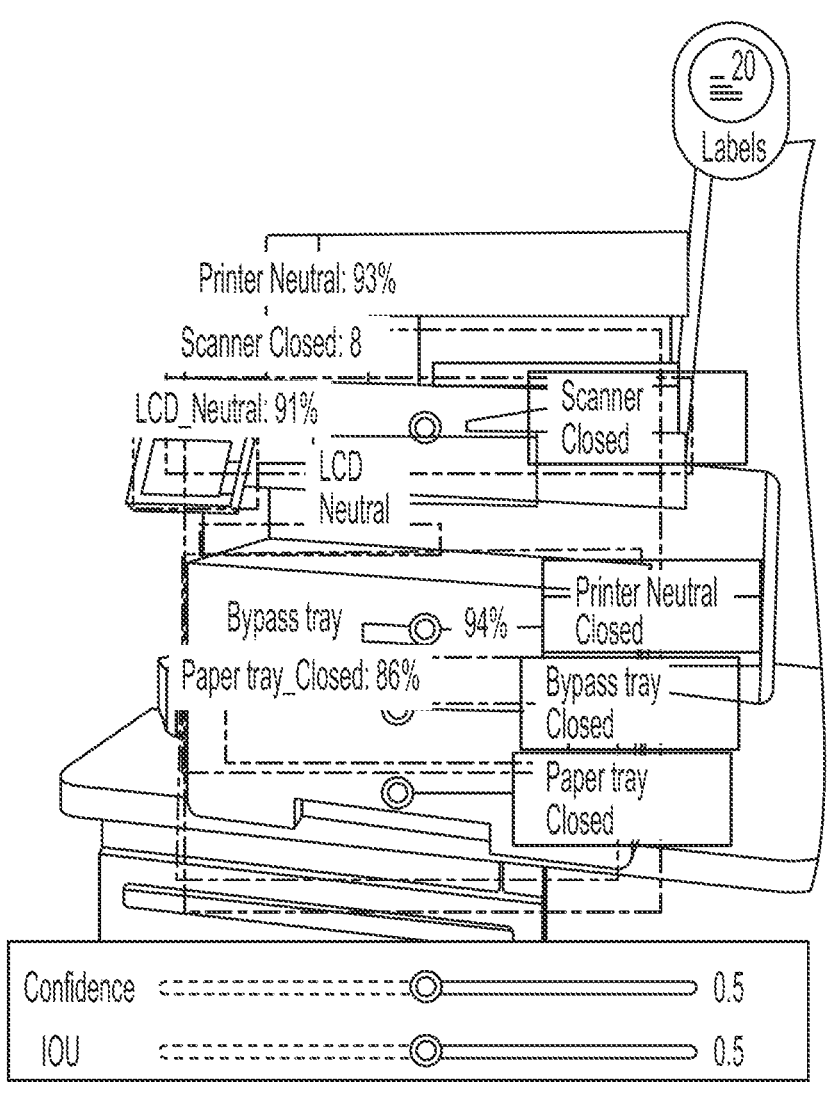
FIG. 3 is an illustration of jumping bounding boxes in object detection.

Referring to FIG. 3, shown is an illustration of jumping bounding boxes in object detection. Unstable/jumping bounding boxes can occur, for example, when object detection and annotation (e.g., bounding boxes) are performed on video frames independently. Bounding boxes might shift and appear jumpy in consecutive frames of a continuous video. This can occur even when there is small camera motion.

Motion often occurs when using mobile devices, for example, as a user is simply holding a smartphone. As the smartphone moves, the bounding boxes will jump/shift in response. Using the present teachings, such unstable/jumping bounding boxes can be reduced or eliminated. For example, a prediction for a new frame may be averaged (or the change otherwise made less drastic) with a proposal from a prior frame to reduce jumping.

Referring to FIG. 4, shown is an illustration of non-unique objects within unique objects (e.g., a hierarchy of objects) in object detection. It may be desirable to detect objects within unique objects. In state detection, for example, there are cases where multiple non-unique objects exist within unique parent objects. Hence there is a need to retrieve hierarchical information about the non-unique objects to eliminate ambiguity. Hierarchical information includes information about the parent object and a child object within which it lies.

Shown is a network switch module that has two Power Supply Units (PSUs). The PSUs may be identical and each contain AC_LED, PS_LED, and Power cable connectors. It is possible to detect the states of the child objects (e.g., LEDs and cable), so it is possible to know which parent object they belong to (Left/Right PSU). In this way, hierarchical information about the objects is used to eliminate ambiguity. This may be helpful, for example, to validate a task step.

It some circumstances it may be preferable to only annotate a subset of object labels in the AR. During task verification, for example, there may be cases when there is only interest in a particular subset of labels from an object model. In the case of "Paper Jam" task verification, one might be only interested in ["Front door", "Back door", "Drum", "Roller" ] object states and no others. So, there is a desire to filter identified object/state predictions and only show relevant ones to reduce clutter in the AR image.

It may also be desirable to keep track of stable proposals in the world state. Current state detection systems may only keep track of detections within a frame. As a result, if detection goes out of frame and comes back in the frame, it is treated as new detection. However, there might be a need to track the detections within world-state. For example, in the case of a printer, it may be desirable to keep track of front-side detections as well as back-side detection to generate hotspots for AR overlays. In this case, it is not possible to keep front and back objects within a frame at same time. Thus, it may be desirable to track a stable proposal in world-state co-ordinate system.

The present teachings provide a system and method that address such deficiencies and desires. A system according to the present teachings may use state predictions by a computer vision model and give proposals and hierarchical information for stable state detections over multiple consecutive frames. The system may be configured with parameters and then run within the inference session to maintain and generate stable object detections.

In an example configuration stage, a system according to the present teachings may use the following config object structure during initialization:

```
StableDetectorConfig {
    Consecutive_frames: The number of consecutive frames the
    proposal should exist before considering it stable.
    STTIOU Threshold: This threshold is used to compare the
    overlap (e.g., IoU over time) between a prediction and existing
    proposals. If a prediction does not exceed this threshold, then it
    is considered a new proposal.
    Stable_boxes: This parameter allows one to select between the
    prediction (bounding box) value or average value of the
    coordinates for proposals.
    Config_labels: This is a dictionary (key-value pair) where the
    keys are used to return a subset of label predictions, and values
    denote the possible parent relationships for that label.
    }
```

Such a config object may be configured as below:

```
StableDetectorConfig {
    Consecutive_frames: 5
    STTIOU_Threshold: 0.5
    Stable_boxes: True
    Config_labels: {
    "AC_LED":["PSU_L", "PSU_R"],
    "PS_LED":["PSU_L", "PSU_R"],
    "PSU_L": null,
    "PSU_R": null }
    }
```

In an example, a computer vision model may be capable of detecting the following labels: ["AC_LED", "PS_LED", "PSU_L", "PSU_R", "Powercable" ]. For this model, the config object for the power supply unit on the right in FIG. 4 may denote a stable detector which will return only ["AC_LED", "PS_LED", "PSU_L", "PSU_R" ] labels, out of which the child objects are considered valid and returned only if they are contained within their parent objects. The "null" value for "PSU_L" and "PSU_R" means that there is no parent relationship present for that label and the standalone prediction is valid.

For each frame, the predictions of computer vision model may also be filtered based on the configuration parameters. In this example, the two parameters used are "Subset of labels" and "contained-within", although not limited thereto. The predictions may be considered only if the prediction labels are present in the "Config_labels" list. This is the "Subset of labels" filtering. The hierarchical filtering may use the parent information from the "Config_labels" list. The non-null hierarchical parent relationship may be enforced by checking if child labels are "contained-within' either of the parent from "Config_labels" list. The predictions available after the filtering may be used for calculating overlaps, discussed below.

In comparing predictions and proposals (e.g., overlap), the system may accept filtered state predictions at each frame and maintain a list of proposals over consecutive frames (e.g., stable proposals). In this way, a prediction (e.g., from a frame) can be used to calculate a stable proposal (e.g., for an interval).

Referring now to FIG. 5, shown is an illustration of overlap comparison according to the present teachings. For each prediction, an overlap may be calculated as intersection over union (IoU) over the duration of the proposal as shown on the right side of the figure. The boxes on the left each represent a current prediction and the boxes on the right represent predictions from a proposal. Each current prediction is either considered as a new proposal or associated to an existing proposal based on overlap with proposals (e.g., a spatio-temporal tube IOU or STT-loU). Each proposal that gets updated may be marked and the update status reset at next frame.

The system may remove inactive proposals and return stable object detections. After assigning predictions to proposals, inactive proposals can be removed from the stored proposals. The proposals that exist the entire "Consecutive_frames" window may be marked as stable and added to a return object (stable object detections).

Based on the "Stable_boxes" parameter from the config object, a mean or recent bounding box prediction value may be used in a result. A return object may contain the child object as well as parent object it is "contained_within" if available in config, otherwise the parent object is null.

In order to track in world-space, an anchor may be dropped by ray casting at the stable proposal centroid. A bounding box can be dropped by ray casting detection bounding box vertices. Once an anchor is dropped, it is possible to remove the label from the Config_labels list (if only interested in one instance of label) or filter detections and ignore detections that have sufficient IOU overlap over the anchor bounding box.

The feature can be extended to detect mutually exclusive states for an object by removing an anchor when a mutually exclusive state covering the anchor is detected (and drop an anchor for new state).

An example return object for the stable object detection is as follows:

```
StableDetectorResult {
    child: A valid stable prediction.
    parent: enclosing parent for the child object from valid list of
    parents if available, else "null" is returned.
    }
```

An example return object for the sample model and config object given before follows, after being valid for 5 consecutive frames:

```
StableDetectorResult {
    "child1": [0.1, 0.1, 0.4, 0.4] // Stable Prediction with Bounding
    box
    "parent1": [0, 0, 0.6, 0.6] // Corresponding parent prediction.
    }
```

Figures 6A, 6B:
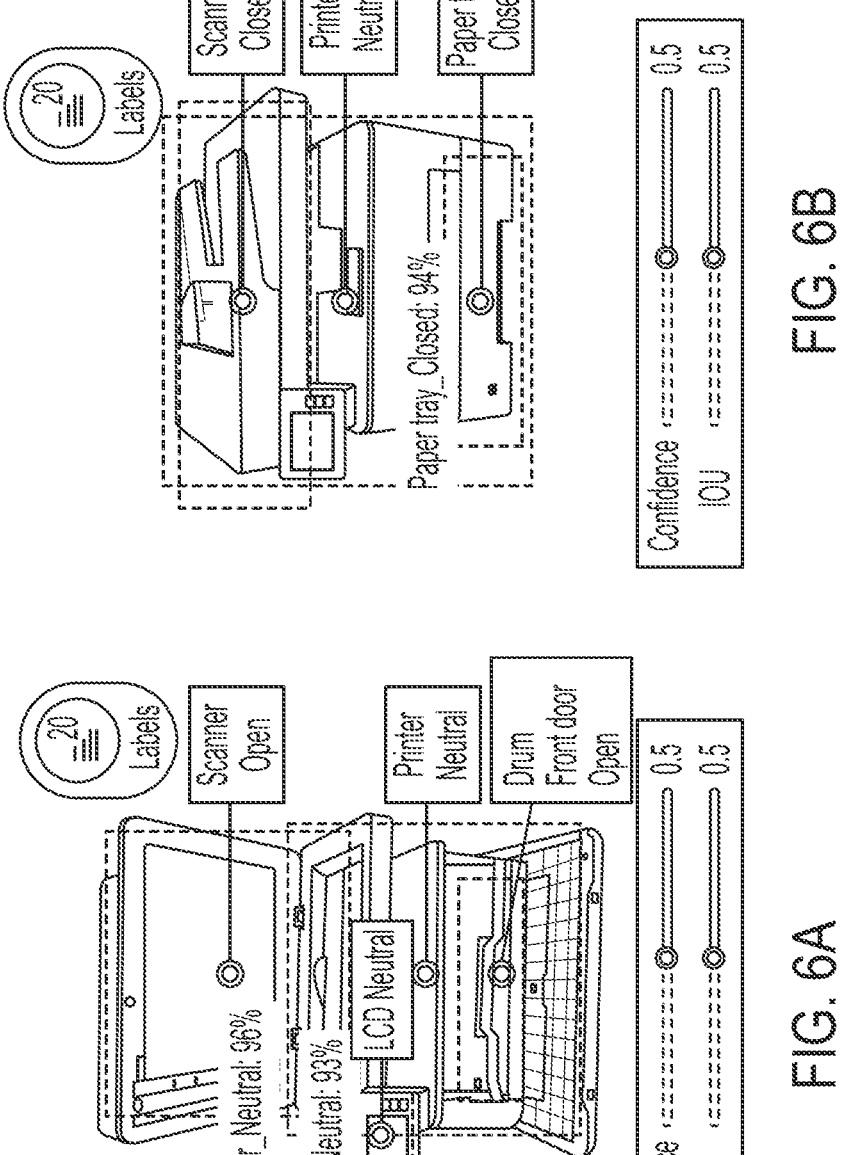
FIGS. 6A-6B are illustrations of AR before and after using the present teachings.

Referring now to FIGS. 6A-6B, shown are illustrations of AR before and after using the present teachings. The present teachings provide a number of advantages, including addressing the deficiencies and desires identified earlier. For example, spurious false positives may be suppressed, bounding boxes may be stabilized and only shown for items of interest, non-unique objects can be differentiated by parent object, hotspots can be shown dynamically based on object state (e.g., front door was open (with front door open hotspot), then was closed, hotspot is updated to closed door hotspot), and AR anchors can be dropped to maintain state when out of view (anchors can be switched when the state of an object changes).

Figure 7:
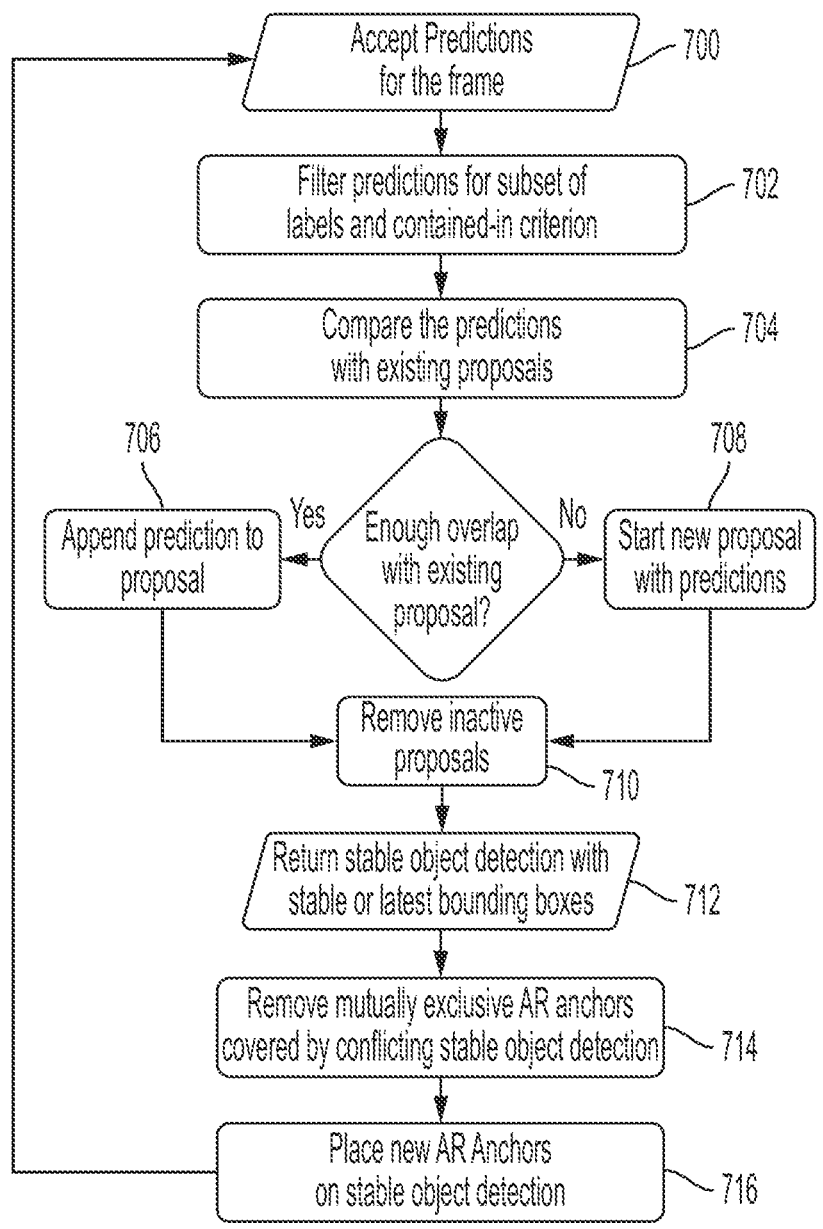
FIG. 7 is a flowchart of one embodiment of a method according to the present teachings.

Referring to FIG. 7, shown is a flowchart of one embodiment of a method according to the present teachings. Predictions for objects identified in an image frame may be generated 700, for example, using object models. The predictions may then be filtered 702 as discussed above to those relevant to the situation. The predictions may then be compared with stored proposals 704. If there is sufficient overlap (or some other comparison attribute is satisfied) the predictions may be added to the proposals 706. If not, new proposals may be created using the predictions 708.

Next, proposals may be removed 710 to create stable object detections. This may be based on, for example, if a proposal has existed a minimum number of frames. Stable object detections (proposals) may be returned, for example, bounding boxes placed that are stable 712. Conflicting (e.g., overlapping) stable object detections may be removed 714. The frame may be annotated using the stable object detections, for example, by placing anchors 716.

Figure 8:
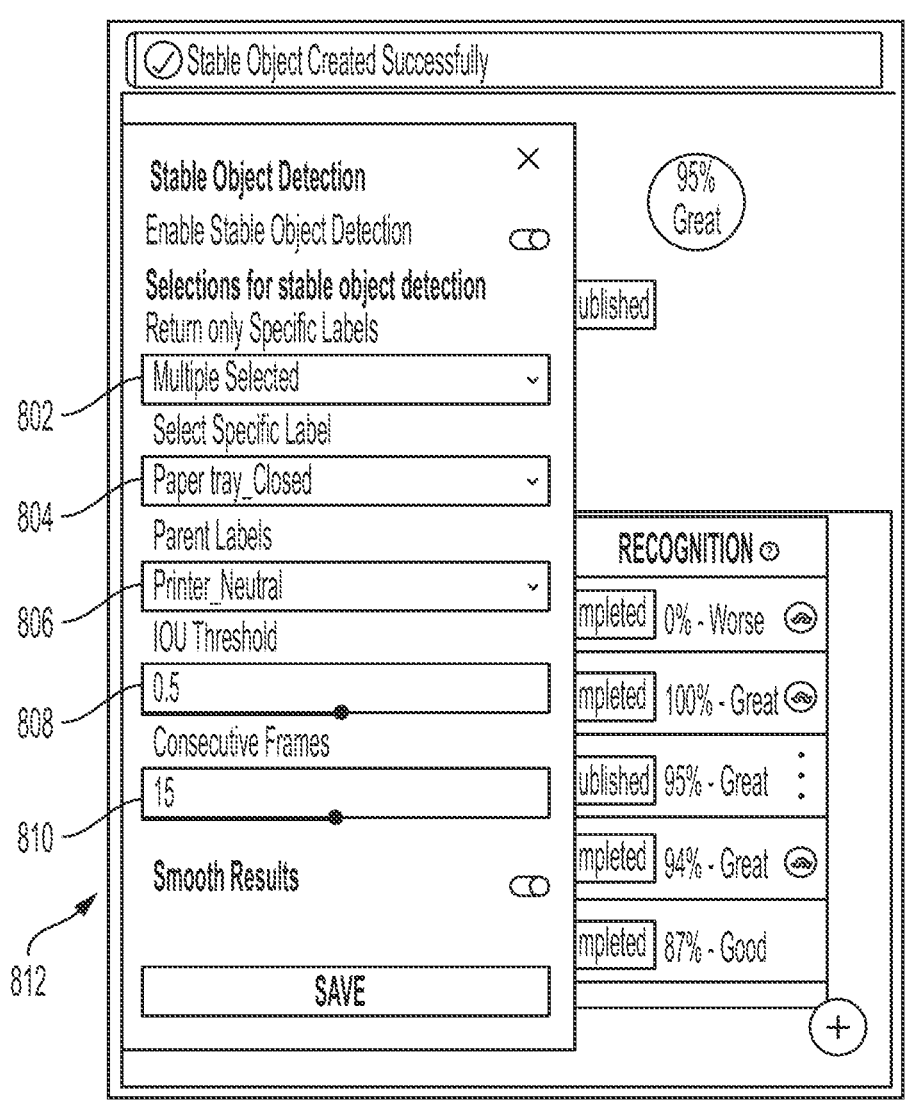
FIG. 8 is an example user interface (UI) for configuring the object detection system of FIG. 1.

Referring now to FIG. 8, shown is an example user interface (UI) for configuring the object detection system. As shown, a user may select a subset of labels that are relevant 802. A user may also select a label 804 and identify a parent label 806 (hierarchy). The user may also select overlap threshold 808 and the number of consecutive frames to consider a proposal stable 810. The settings 812 may be saved and used for the object detection system.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for object detection in an augmented reality scene, comprising:

a computing system adapted to receive a stream of images from a user device;

for each image in a plurality of successive images from the stream of images, the computing system adapted to:

generate predictions for objects identified in the image using object models from a datastore;

identify a parent object and a corresponding set of child objects within a hierarchy of the parent object and the corresponding set of child objects stored in the datastore;

filter the predictions by removing predictions for objects that are not within the hierarchy of the parent object and the corresponding set of child objects;

compare the filtered predictions with proposals from the datastore, the comparison including computing a spatio-temporal intersection-over-union score across successive images;

update the proposals with the filtered predictions when the spatio-temporal intersection-over-union score satisfies a stability threshold, otherwise add new proposals;

filter the proposals to create stable object detections based on a stability threshold;

classify the filtered proposals as stable object detections when each proposal persists across at least a defined number of successive images;

annotate the image using the stable object detections; and send the annotated image, including anchor data associated with the stable object detections, to the user device for presentation in the augmented reality scene.

2. The system of claim 1, wherein:

the spatio-temporal intersection-over-union score across successive images comprises at least 50% of overlap;

the proposals with the predictions comprises averaging coordinates of the predictions with coordinates of the proposals;

the stability threshold comprises the proposals existing for at least 5 images; and the annotating the image comprises adding a bounding box.

3. The system of claim 1, wherein:

the annotating the image comprises placing an anchor by ray casting at a center of one of the stable object detections;

the anchor is stored in an anchor list in the datastore; and the anchor is only placed when an anchor overlap threshold with another anchor in the anchor list is not exceeded.

4. The system of claim 1, wherein the predictions generated using the object models comprise labels, confidence values, and/or bounding boxes.

5. The system of claim 1, wherein the annotating the image comprises adding a bounding box.

6. The system of claim 1, wherein:

the computing a spatio-temporal intersection-over-union score across successive images comprises at least 50% of overlap.

7. The system of claim 1, wherein the stability threshold comprises the proposals existing for at least 5 images.

8. The system of claim 1, wherein updating the proposals with the predictions comprises averaging coordinates of the predictions with coordinates of the proposals.

9. The system of claim 1, wherein the filter the predictions further includes removing predictions for objects that are not in a specified subset of labeled objects for each image in the plurality of successive images from the stream of images.

10. The system of claim 9, wherein the specified subset comprises predictions for objects that relate to a task that is part of an augmented reality workflow.

11. The system of claim 1, wherein the user device comprises a mobile device.

12. The system of claim 1, wherein the annotating the image comprises adding a link to an action.

13. The system of claim 12, wherein the action comprises providing information about an associated object, information about a workflow step, and/or a link to a website.

14. An augmented reality support platform, comprising:

the system of claim 1;

wherein the identified objects are parts of a product that is being supported; and the computing system is adapted to provide tasks for troubleshooting support of the product, and to detect whether a task has been completed.

15. An augmented reality support platform, comprising:

a computing system adapted to receive a stream of images from a user device;

for each image in a plurality of successive images from the stream of images, the computing system adapted to:

generate predictions for objects identified in the image using object models from a datastore;

identify a parent object and a corresponding set of child objects within a hierarchy of the parent object and the corresponding set of child objects stored in the datastore;

filter the predictions by removing predictions for objects that are not within the hierarchy of parent object and the corresponding set of child objects, including removing predictions for objects that do not correspond to a valid parent-child relationship in the hierarchy;

compare the filtered predictions with proposals from the datastore, the comparison including computing a spatio-temporal tube intersection-over-union analysis across successive images;

update the proposals with the filtered predictions, when the spatio-temporal tube intersection-over-union score satisfies a stability threshold, otherwise add new proposals by averaging coordinates of the predictions with coordinates of the proposals;

filter the proposals to create stable object detections that have existed for a minimum number of images;

classify the filtered proposals as stable object detections when each proposal persists across at least a defined number of successive images;

annotate the image using the stable object detections and generate anchor data associated with the stable object detections;

send the annotated image to the user device for presentation in an augmented reality scene;

wherein the identified objects are parts of a product that is being supported; and the computing system is adapted to provide tasks for troubleshooting support of the product, and to detect whether a task has been completed.

16. The system of claim 15, wherein:

the computing a spatio-temporal intersection-over-union score across successive images comprises at least 50% of overlap.

17. The system of claim 15, wherein:

the annotating the image comprises placing an anchor by ray casting at a center of one of the stable object detections;

the anchor is stored in an anchor list in the datastore; and the anchor is only placed when an anchor overlap threshold with another anchor in the anchor list is not exceeded.

18. The system of claim 15, wherein the filter the predictions, the filtering including removing predictions for objects that are not in a specified subset of labeled objects for each image in the plurality of successive images from the stream of images.

19. A method for object detection in an augmented reality scene, comprising:

receiving, with a computing system, a stream of images from a user device;

for each image in a plurality of successive images from the stream of images:

generating predictions for objects identified in the image using object models from a datastore;

identifying a parent object and a corresponding set of child objects within a hierarchy of the parent object and the corresponding set of child objects stored in the datastore for an identified object;

filtering the predictions by removing predictions for objects that are not within the hierarchy of the parent object and the corresponding set of child objects;

comparing the filtered predictions with proposals from the datastore, the comparison including computing a spatio-temporal intersection-over-union score across successive images;

updating the proposals with the filtered predictions when the spatio-temporal intersection-over-union score satisfies a stability threshold, otherwise add new proposals;

filtering the proposals to create stable object detections based on a stability threshold;

classifying the filtered proposals as stable object detections when each proposal persists across at least a defined number of successive images;

annotating the image using the stable object detections;

sending, with the computing system, the annotated image, including anchor data associated with the stable object detections, to the user device for presentation in the augmented reality scene.

\* \* \* \* \*